Sept. 10, 1929.  A. F. GODEFROY  1,728,054
ELECTRIC MOTOR
Filed Feb. 25, 1927  2 Sheets-Sheet 1
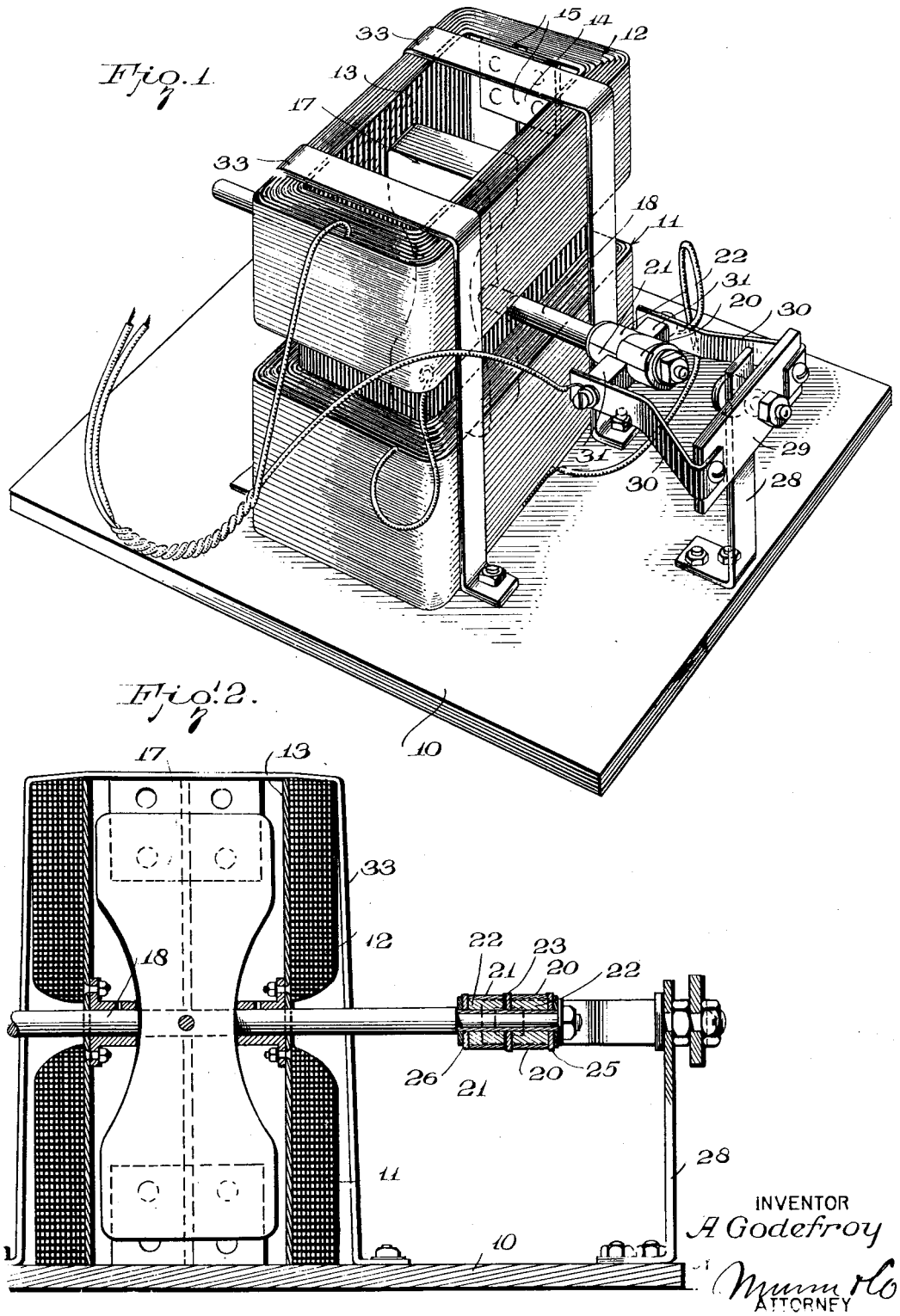

Sept. 10, 1929.   A. F. GODEFROY   1,728,054
ELECTRIC MOTOR
Filed Feb. 25, 1927   2 Sheets-Sheet 2
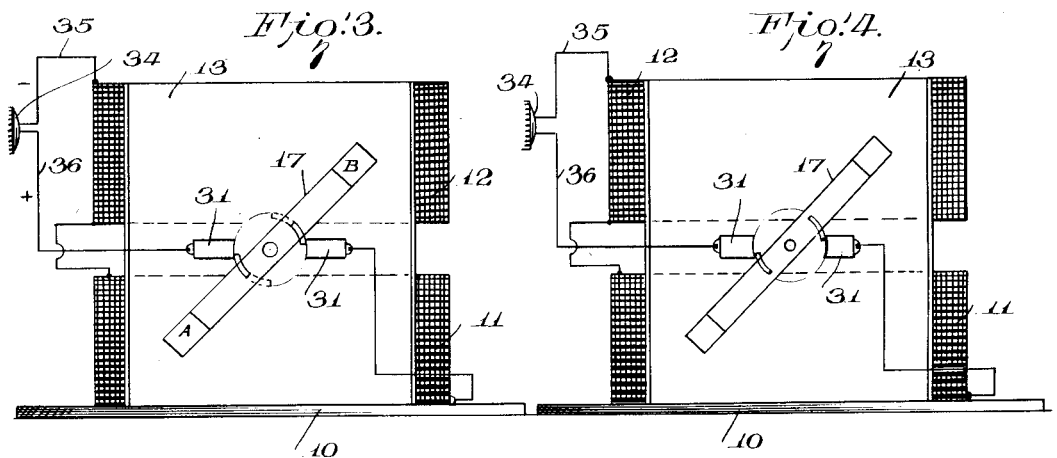
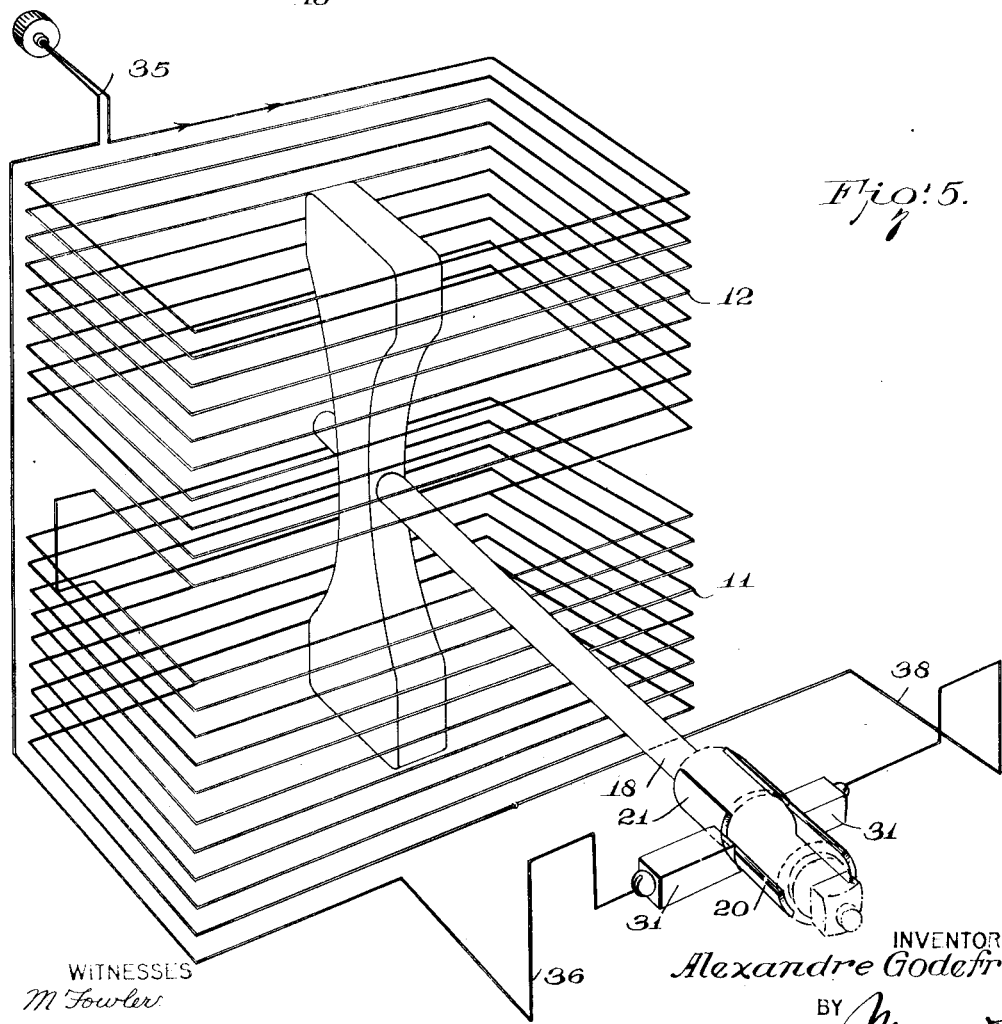
INVENTOR
Alexandre Godefroy
BY
ATTORNEY Patented Sept. 10, 1929.

1,728,054

UNITED STATES PATENT OFFICE.

ALEXANDRE F. GODEFROY, OF MEXICO, MEXICO.

ELECTRIC MOTOR.

Application filed February 25, 1927. Serial No. 170,867.

This invention relates to improvements in electric motors.

The invention more particularly relates to improvements in electric motors of the solenoid type; and the prime object of the invention is to provide a motor of the type specified whereby a relatively high torque and speed of the revolving element or armature may be obtained.

It is also within the scope of the objects of the invention to provide a motor as above characterized that will operate efficiently, be comparatively inexpensive to build, and not subject to excessive wear or getting out of order.

It is also an object of the invention that the motor be adapted to operate from either alternating or direct current.

The invention is illustrated by way of example in the accompanying drawings, in which;

Figure 1 is a perspective view of a motor constructed in accordance with my present invention.

Figure 2 is a vertical sectional view of the motor shown in Figure 1, taken in a plane parallel to the shaft of the motor.

Figures 3 and 4 are reduced vertical sectional views taken through the motor in a plane transverse to the shaft or armature of the motor, and illustrating the manner in which the armature is driven, and Figure 5 is a diagrammatic view of the solenoid windings of the motor together with the connections whereby the same are energized with the rotation of the armature of the motor.

Referring to the drawings more particularly, 10 indicates a suitable base upon which may be mounted the motor of this invention. The motor is of the solenoid type and comprises substantially one winding formed to provide two sections 11 and 12 supported upon a frame 13. The frame 13 is of non-magnetic material and has one of its vertical sides split as at 14; and the split portions thereof are secured together by plates of insulating material as at 15.

Within the frame 13 there is mounted an armature generally indicated by reference character 17. The armature is preferably of the shape shown and made of magnetic material such as soft iron or the like. The armature is rotatably supported by a shaft 18. The shaft 18 may be journaled by the side walls of the frame or core 13. The shaft is extended at one end, and said end carries a commutator having two pairs of segments 20 and 21. The segments may be imbedded in a suitable sleeve of insulating material 22. The sleeves of insulating material may be secured upon the motor shaft 18 in the manner illustrated in Figure 2. A washer 23 of insulating material is interposed between the segments 20 and 21. The segments 20 are electrically connected by a metallic washer 25, and the segments 21 in a similar manner by washer 26.

The base 10 may support a suitable brush holder comprising a bracket 28 and a cross arm 29. The arm 29 is of insulating material and carries two resilient arms 30. Each arm 30 carries a brush 31. The brushes 31 are so arranged that they will engage the opposing ends of the segments 20 and 21 with rotative movement of the shaft 18.

It should be here pointed out that the coils 11 and 12 are connected in series with each other and so connected that the magnetic fields set up by the two coiled sections 11 and 12 will oppose one another interiorly of the frame 13. Also the coils are connected in series with the brushes 31.

The two half coils or sections 11 and 12 may be better secured in position by straps such as shown at 33.

The electrical connections between the coil sections 11 and 12, brushes 31, and source of current are best shown in Figures 3, 4 and 5. Referring to these figures, 34 represents a plug which may be connected to a source of current in the usual manner. A lead 35 is extended from the plug to one end of coil 12 and another lead 36 extended to a brush 31. The remaining end of coil 12 is connected with one end of coil 11. It will be noted that the coils 11 and 12 are so wound that current passing therethrough will flow in opposite directions as indicated by arrows in Figure 5, so that the magnetic fields thereof will be opposed one to the other as aforesaid.

The coil 11 has its remaining end connected through lead 38 with the remaining brush 31.

When it is desired to operate the motor heretofore described, the shaft 18 should be in such a position that current can flow between brushes 31 either through the segments 21 and washer 26, or through segments 20 and washer 25. With this occurring current can flow through the coils 11 and 12. If the armature 17 is in the position shown in Figure 3, the magnetic fields set up by the windings 11 and 12 will cause a driving force at each end of the armature and, by being neutralized at the inner adjacent ends of the winding sections, will cause the armature to rotate as the ends of the same pass inwardly of the outer end portions of the winding sections. When the armature has rotated sufficiently to bring the other set or pair of segments in proper position, an electrical circuit will again be established. This last named position of the armature is such as illustrated in Figure 4, and a compound impulse will be delivered to the armature.

I have found the armature will develop considerable torque when rotated at a relatively high speed. I have also found that my motor will operate when the source of current supply is either direct current or alternating current.

While I have shown and described a construction of motor by which my invention can be practiced, it is to be understood that I am not to be so limited, as the general arrangement of parts and construction of the same can be changed by those skilled in the art and the same results obtained as indicated by the appended claims.

What I claim is:

1. An electric motor comprising a winding formed to provide two coil sections one spaced from the other in alined relation, an armature shaft extended through the space between said coil sections, and an elongated armature of a magnetic metal supported by said shaft and operable within said coil sections.

2. An electric motor comprising a frame, a winding carried by said frame and formed to provide two coil sections one spaced from the other in alined relation, an armature shaft extended through the space between said coil sections, and an elongated armature of a magnetic metal supported by said shaft and operable within said coil sections.

3. An electric motor comprising a frame, of a non-magnetic material, a winding carried by said frame and formed to provide two coil sections one spaced from the other in alined relation, an armature shaft extended through the space between said coil sections, and an elongated armature of a magnetic metal supported by said shaft and operable within said coil sections.

4. An electric motor comprising a winding formed to provide two coil sections one spaced from the other in end to end relation, said coils being arranged so that the magnetic fields of the same, when energized, are neutralized at the inner adjacent ends thereof, an armature shaft passing through the space between said coil sections, and an elongated armature of a magnetic metal centered on said shaft and operable within said coil sections, whereby rotative impulses are imparted to the outer ends of the same in each half revolution of said shaft.

5. An electric motor comprising a winding formed to provide two coil sections one spaced from the other in end to end relation, an armature shaft extended through the space between said coil sections, an elongated armature of a magnetic metal centered on said shaft and operable within said coil section, a commutator mounted on said shaft and having diametrically disposed segments arranged in pairs, one segment of each pair being circumferentially offset from the others thereof, and brushes arranged to overlappingly engage the adjacent of the segments of each pair of the same in each half revolution of said shaft, said coil sections being connected in series one with the other and with said brushes, said segments being arranged on said commutator in a plane at right angles to the longitudinal axis of said armature, whereby said coil sections are energized when the opposite ends of said armature are passed toward and from the outer ends of the same in each one-half revolution of said shaft.

ALEXANDRE F. GODEFROY.